(12) United States Patent
Osawa et al.

(10) Patent No.: US 9,079,492 B2
(45) Date of Patent: Jul. 14, 2015

(54) ACCELERATOR PEDAL DEVICE

(75) Inventors: Tsuyoshi Osawa, Odawara (JP); Masato Kumamoto, Odawara (JP); Kouji Kikuchi, Yokohama (JP); Tsuyoshi Shimizu, Yokohama (JP); Hisashi Kawade, Yokohama (JP); Hiromutsu Touhachi, Yokohama (JP)

(73) Assignees: MIKUNI CORPORATION, Tokyo (JP); NISSAN MOTOR CO., LTD., Yokohama (JP)

( * ) Notice: Subject to any disclaimer, the term of this patent is extended or adjusted under 35 U.S.C. 154(b) by 1011 days.

(21) Appl. No.: 12/588,119

(22) Filed: Oct. 5, 2009

(65) Prior Publication Data
US 2010/0083789 A1 Apr. 8, 2010

(30) Foreign Application Priority Data

Oct. 6, 2008 (JP) .................. 2008-259194
Jul. 15, 2009 (JP) .................. 2009-166257

(51) Int. Cl.
*B60K 26/02* (2006.01)
*G05G 5/03* (2008.04)
*G05G 1/38* (2008.04)

(52) U.S. Cl.
CPC .............. *B60K 26/02* (2013.01); *B60K 26/021* (2013.01); *G05G 1/38* (2013.01); *G05G 5/03* (2013.01); *B60Y 2400/15* (2013.01); *Y10T 74/20534* (2015.01)

(58) Field of Classification Search
CPC ............. G05G 1/44; G05G 1/30; G05G 5/03; B60K 26/021
USPC ................ 74/512–514, 560; 200/86.5, 61.89; 267/173, 174, 178, 228, 248, 249

IPC ................. B60K 26/02; G05G 5/06,1/00, 1/30, G05G 1/34
See application file for complete search history.

(56) References Cited

U.S. PATENT DOCUMENTS 5,529,296 A * 6/1996 Kato et al. .................... 267/155
6,745,642 B2 * 6/2004 Kumamoto et al. ............ 74/512

(Continued)

FOREIGN PATENT DOCUMENTS

DE 102004025829 A1 * 12/2005
EP 1375233 A1 * 1/2004

(Continued)

OTHER PUBLICATIONS

Description DE102004025829. Patent Translate. European Patent Office. Jul. 13, 2012. http://translationportal.epo.org/emtp/translate/?ACTION=description-retrieval&COUNTRY=DE&FORMAT=docdb&KIND=A1&LOCALE=en_EP&NUMBER=102004025829&OPS=ops.epo.org&ENGINE=google&SRCLANG=de&TRGLANG=en.*

*Primary Examiner* — Daniel Yabut
(74) *Attorney, Agent, or Firm* — Staas & Halsey LLP

(57) ABSTRACT

An accelerator pedal device having a pedal arm working in conjunction with an accelerating pedal, a housing to rotatably support the pedal arm around a prescribed pivot axis line between a rest position and a maximum applied position, a hysteresis generation mechanism that comes in contact with the vicinity of an upper end of the pedal arm to generate hysteresis in a pedal force of the accelerator pedal, and an active control mechanism to push back the pedal arm toward the rest position under prescribed conditions between the pivot axis line and the hysteresis generation mechanism. The active control mechanism includes a drive source provided in the housing, and a return lever that is rotated in the same direction as the direction of the swinging of the pedal arm in conjunction with the drive source and is detachably engaged with the vicinity of the upper end of the pedal arm.

4 Claims, 5 Drawing Sheets

(56) References Cited

U.S. PATENT DOCUMENTS

| | | | |
|---|---|---|---|
| 7,082,853 B2 * | 8/2006 | Fujiwara | 74/512 |
| 2002/0100341 A1 * | 8/2002 | Kumamoto et al. | 74/512 |
| 2004/0011155 A1 * | 1/2004 | Kumamoto et al. | 74/513 |
| 2004/0144194 A1 * | 7/2004 | Allen et al. | 74/512 |
| 2007/0245844 A1 * | 10/2007 | Yokoyama et al. | 74/512 |
| 2008/0134830 A1 * | 6/2008 | Park | 74/514 |
| 2008/0141820 A1 * | 6/2008 | Park et al. | 74/513 |

FOREIGN PATENT DOCUMENTS

| | | |
|---|---|---|
| EP | 1602520 A2 * | 12/2005 |
| JP | 2004-155375 | 6/2004 |
| JP | 2007-137152 | 6/2007 |

\* cited by examiner

# ACCELERATOR PEDAL DEVICE

CROSS-REFERENCE TO RELATED APPLICATIONS

This application claims the benefit of Japanese Patent Application Nos. 2008-259194, filed Oct. 6, 2008, and 2009-166257, filed Jul. 15, 2009, in the Japanese Intellectual Property Office, the disclosures of which are incorporated herein by reference.

BACKGROUND

1. Field

The present invention relates to an accelerator pedal device that is applicable to vehicles and the like adopting the drive-by-wire system, and in particular relates to an accelerator pedal device including an active control mechanism that generates, for danger avoidance or danger warning, reactive force (that is, push back force) that counteracts the pedal force of the pedal arm.

2. Description of the Related Art

As an accelerator pedal device that is applicable to a computerized throttle system (drive-by-wire system) in an engine mounted on a vehicle or the like, known is a type including a pedal arm that is formed integrally with an accelerator pedal and swingably supported by a housing, a return spring for returning the pedal arm to a rest position, a hysteresis generation mechanism for generating hysteresis in the pedal load (pedal force), a position sensing device for detecting the angular position of the pedal arm, and so on, and which uses the position sensing device to detect the applied amount (angular position) of the accelerator pedal (pedal arm), and controls the output of the engine based on the detection signal (for instance, refer to Japanese Patent Laid-Open Publication No. 2004-155375).

Meanwhile, with vehicles in recent years, accelerator pedal devices including an active control mechanism are being developed for performing control so as to push back the accelerator pedal by going against the flooring operation of the driver when the vehicle ahead comes near while driving or when it is necessary to warn or notify other dangers.

As this kind of accelerator pedal device, known is a type including a pedal arm that is formed integrally with the accelerator pedal and supported swingably by a housing (case bracket), a spindle that is supported swingably by the pedal arm, and a coil-shaped return spring for returning the pedal arm to the rest position, and further including an active control mechanism (accelerator restraining means) including a rod capable of coming in contact with an upper end of the pedal arm that is disposed so as to pass through the return spring, a slider for retaining a rod and a second spring for biasing the rod toward the pedal arm side, a lead screw that is rotatably supported by the housing so as to reciprocally drive the slider and integrally formed with the gear, and a motor that is fixed to the house so as to rotatably drive the worm gear that engages with the gear of the lead screw (for instance, refer to Japanese Patent Laid-Open Publication No. 2007-137152).

Nevertheless, since this kind of active control mechanism adopts a pathway of the driving force (push back force) of worm gear, gear and lead screw, and then slider and rod, the structure becomes complex and the device becomes a large size, and this is undesirable because the responsiveness will be inferior (response speed will be slow) when danger avoidance or the like is required.

Moreover, while the pedal arm swings (rotates) around the spindle, the rod of the accelerator control mechanism reciprocates linearly. Thus, since the upper end of the pedal arm describes an arc while the apical part of the rod describes a linear trajectory, the contact status upon the apical part of the rod coming in contact with the upper end of the pedal arm will change according to the angle of the pedal arm, and there is a problem in that preferable restraining force (push back force) cannot be obtained.

Moreover, if the active control mechanism (accelerator restraining means) described in Japanese Patent Laid-Open Publication No. 2007-137152 is applied to the accelerator pedal device described in Japanese Patent Laid-Open Publication No. 2004-155375, since the accelerator pedal device of Japanese Patent Laid-Open Publication No. 2004-155375 is configured by including a hysteresis generation mechanism, the structure becomes even more complex and the application as-is will be difficult. If the hysteresis generation mechanism and the active control mechanism are combined, it is necessary to ensure the independence of the respective functions so that one mechanism does not affect the other mechanism.

Accordingly, the development of an accelerator pedal device having a simple structure and able to seek miniaturization, the hysteresis generation mechanism and the active control mechanism, which are able to function reliably in an independent manner, and capable of active control superior in responsiveness, is needed.

SUMMARY

The present invention was devised in view of the foregoing circumstances, and an aspect thereof is to provide an accelerator pedal device capable of simplifying the structure, reducing the number of components, achieving cost reduction, and miniaturizing the overall device, successively combining the hysteresis generation mechanism for generating hysteresis in the pedal force and the active control mechanism for generating push back force that counteracts the pedal force of the accelerator pedal upon danger avoidance or danger warning, causing both mechanisms to function reliably in an independent manner, and performing active control superior in responsiveness.

Additional aspects and/or advantages will be set forth in part in the description which follows and, in part, will be apparent from the description, or may be learned by practice of the invention.

The accelerator pedal device includes a pedal arm working in conjunction with an accelerator pedal, a housing to rotatably support the pedal arm around a prescribed pivot axis line between a rest position and a maximum applied position, a hysteresis generation mechanism that comes in contact with the vicinity of an upper end of the pedal arm to generate hysteresis in a pedal force of the accelerator pedal, and an active control mechanism to perform control to push back the pedal arm toward the rest position under prescribed conditions between the pivot axis line and the hysteresis generation mechanism. The active control mechanism includes a drive source provided in the housing, and a return lever that is rotated in the same direction as the direction of the swinging of the pedal arm in conjunction with the drive source and is detachably engaged in the vicinity of the upper end of the pedal arm.

According to this configuration, when the operator (driver) operates the accelerator pedal and swings the pedal arm between the rest position and the maximum applied position, obtained is pedal force in which hysteresis is generated with the hysteresis generation mechanism. In addition, under prescribed conditions (for instance, when danger avoidance or danger warning becomes necessary while the vehicle is being driven), the active control mechanism will operate and generate push back force of pushing back the pedal arm by counteracting the pedal force of the operator (driver).

Here, with the hysteresis generation mechanism, the slider is detachably engaged with the pedal arm, and, with the active control mechanism, the return lever is detachably engaged with the vicinity of the upper end of the pedal arm. Thus, the respective mechanisms operate independently on the pedal arm, and it is possible to prevent one mechanism from affecting the other mechanism, and obtain the intended hysteresis characteristics in the pedal force. In addition, even if the hysteresis generation mechanism or the active control mechanism malfunctions, since the return lever is detachable from the pedal arm, it is possible to guarantee that the pedal arm is reliably returned to the safe side (rest position).

Moreover, since the active control mechanism is configured from a drive source (for instance, a torque motor), and a return lever that is rotated in the same direction as the direction of the swinging of the pedal arm in conjunction with the drive source and can be detachably engaged with the vicinity of the upper end of the pedal arm, it is possible to improve the responsiveness in cases where active control is required under prescribed conditions while achieving the simplification of the active control mechanism and the miniaturization of the device.

In the foregoing configuration, it is possible to adopt a configuration of providing a receptive groove with which the return lever is detachably engaged, on the upper end of the pedal arm.

According to the foregoing configuration, since the return lever will enter into the receptive groove upon engaging with the upper end of the pedal arm, it is possible to restrain dispersion in the contact position, and push back force can be stably applied to the pedal arm.

In the foregoing configuration, the hysteresis generation mechanism may adopt a configuration of including a return spring for generating biasing force that returns the pedal arm to the rest position, and a slider provided between the return spring and the upper end of the pedal arm.

According to the foregoing configuration, during normal operation, biasing force is applied for returning the pedal arm to the rest position via the slider based on the return spring of the hysteresis generation mechanism.

In the foregoing configuration, a configuration may be adopted there at least either the receptive groove or the return lever is provided with a friction reduction member.

According to the foregoing configuration, if there is any slippage in the engagement area of the return lever and the receptive groove of the pedal arm, the frictional resistance caused by the sliding can be reduced by interposing a friction reduction member (for instance, a resin material or a metal material with high lubricating performance) between the two components, whereby the drive source can be subject to power saving and miniaturization.

In the foregoing configuration, a configuration may be adopted where the pedal arm is provided with a control unit for controlling the drive source.

According to the foregoing configuration, the wiring and the like can be shortened and the reliability can be improved by integrally forming the pedal housing and the control unit. Moreover, it is possible to easily mount an accelerator pedal device including an active control mechanism without requiring any significant change on the vehicle side.

According to the accelerator pedal device configured as described above, it is possible to obtain an accelerator pedal device capable of simplifying the structure, reducing the number of components, achieving cost reduction, and miniaturizing the overall device, successively combining the hysteresis generation mechanism for generating hysteresis in the pedal force and the active control mechanism for generating push back force that counteracts the pedal force of the accelerator pedal upon danger avoidance or danger warning, and improving the responsiveness of the active control mechanism.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE EMBODIMENTS

Figure 1:
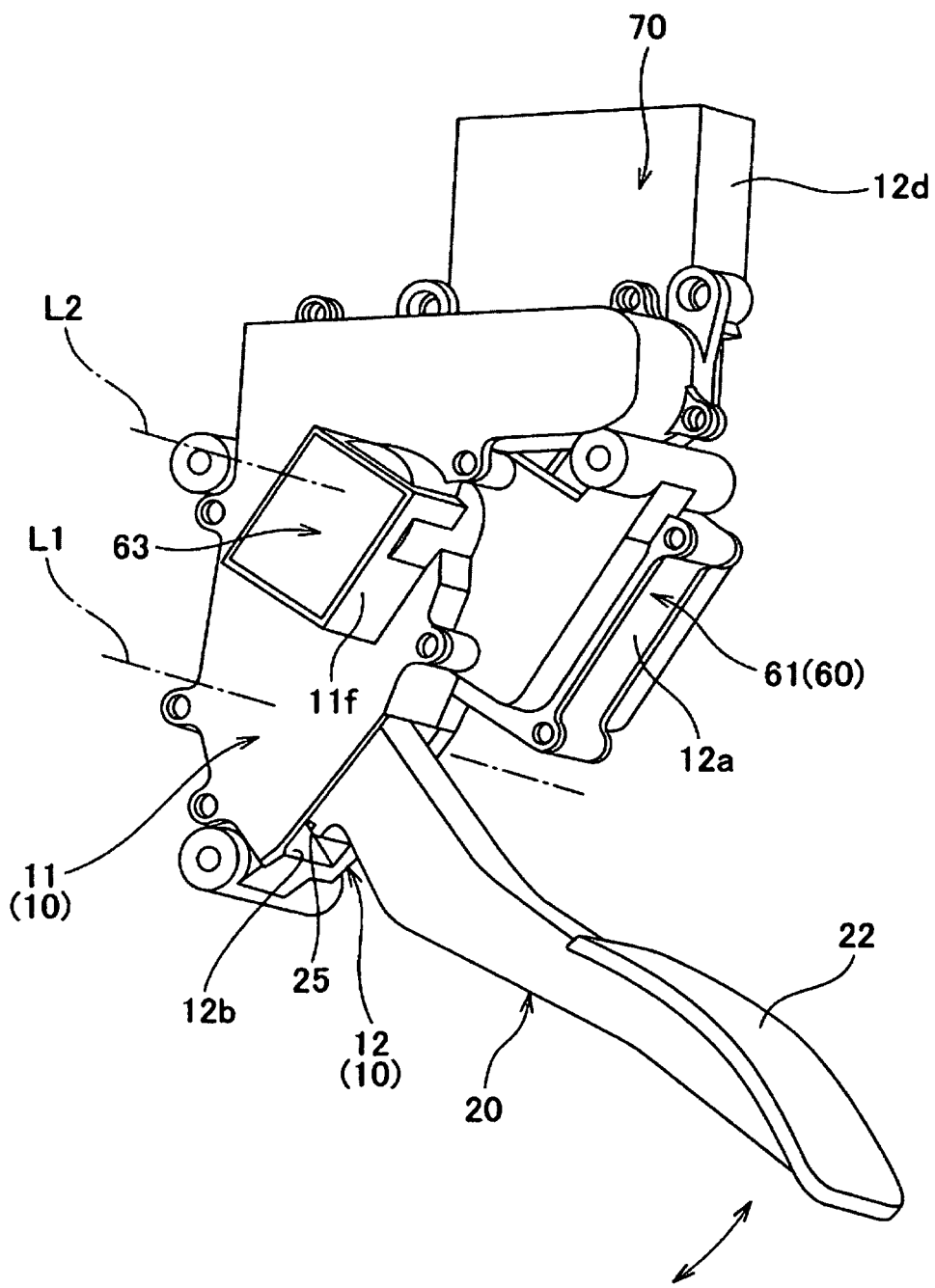
FIG. 1 is a perspective view showing an embodiment of the accelerator pedal device.

Reference will now be made in detail to embodiments of the accelerator pedal device, an example of which is illustrated in the accompanying drawings, wherein like reference numerals refer to like elements throughout. The embodiments are described below to explain the present invention by referring to the attached drawings.

This accelerator pedal device, as shown in FIG. 1 to FIG. 5, includes a housing 10 that is fixed to a body of a vehicle, a pedal arm 20 including an accelerator pedal 22 and supported swingably around the prescribed pivot axis line L1 defined by the housing 10, a return spring 30 that applies biasing force for returning the pedal arm 20 to the rest position, a hysteresis generation mechanism 40 (including a first slider 41, a second slider 42, a return spring 43 and the like) to apply biasing force to return the pedal arm 20 to the rest position and generating hysteresis in the pedal force (pedal load), a position sensing device 50 to detect the position of rotation angle of the pedal arm 20, an active control mechanism 60 (including a drive source 61, a return lever 62, a position sensing device 63 and the like) to generate push back force to push back the pedal arm 20 toward the rest position under prescribed conditions, and a control unit 70 to perform drive control of the drive source 61.

Figure 2:
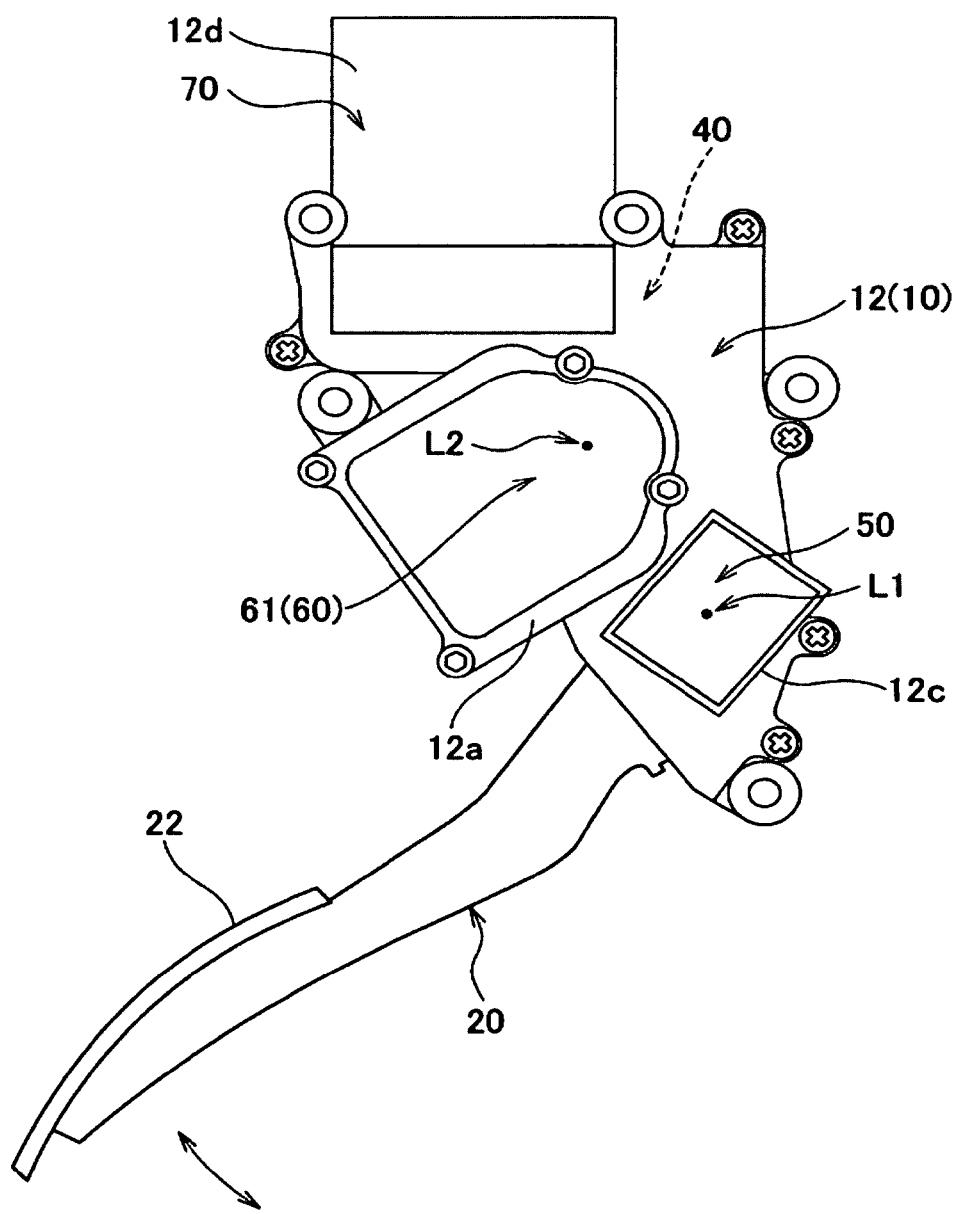
FIG. 2 is a side view showing the accelerator pedal device illustrated in FIG. 1.

The overall housing 10 is formed from a resin material and, as shown in FIG. 1 and FIG. 2, is formed from housing hemis 11, 12 that are mutually coupled with a screw.

Figure 3:
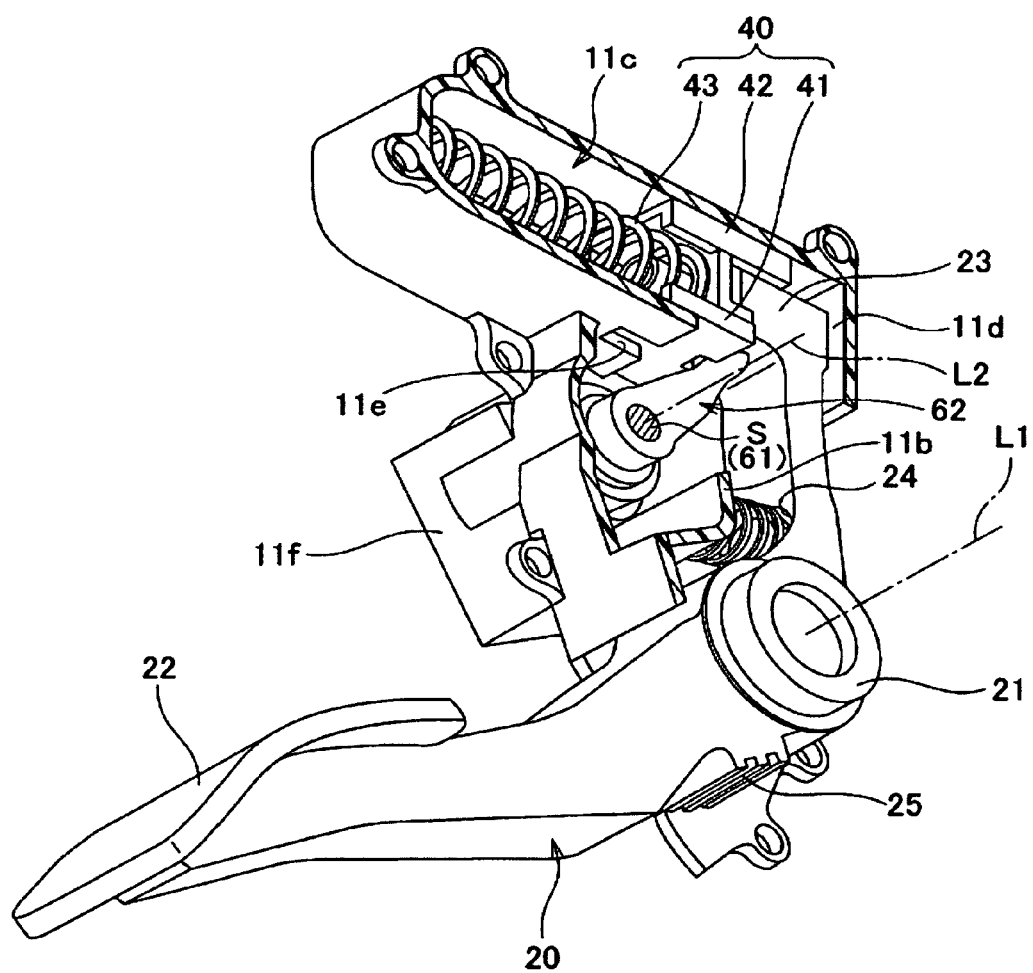
FIG. 3 is a perspective view showing the internal structure of the accelerator pedal device illustrated in FIG. 1.
Figure 4:
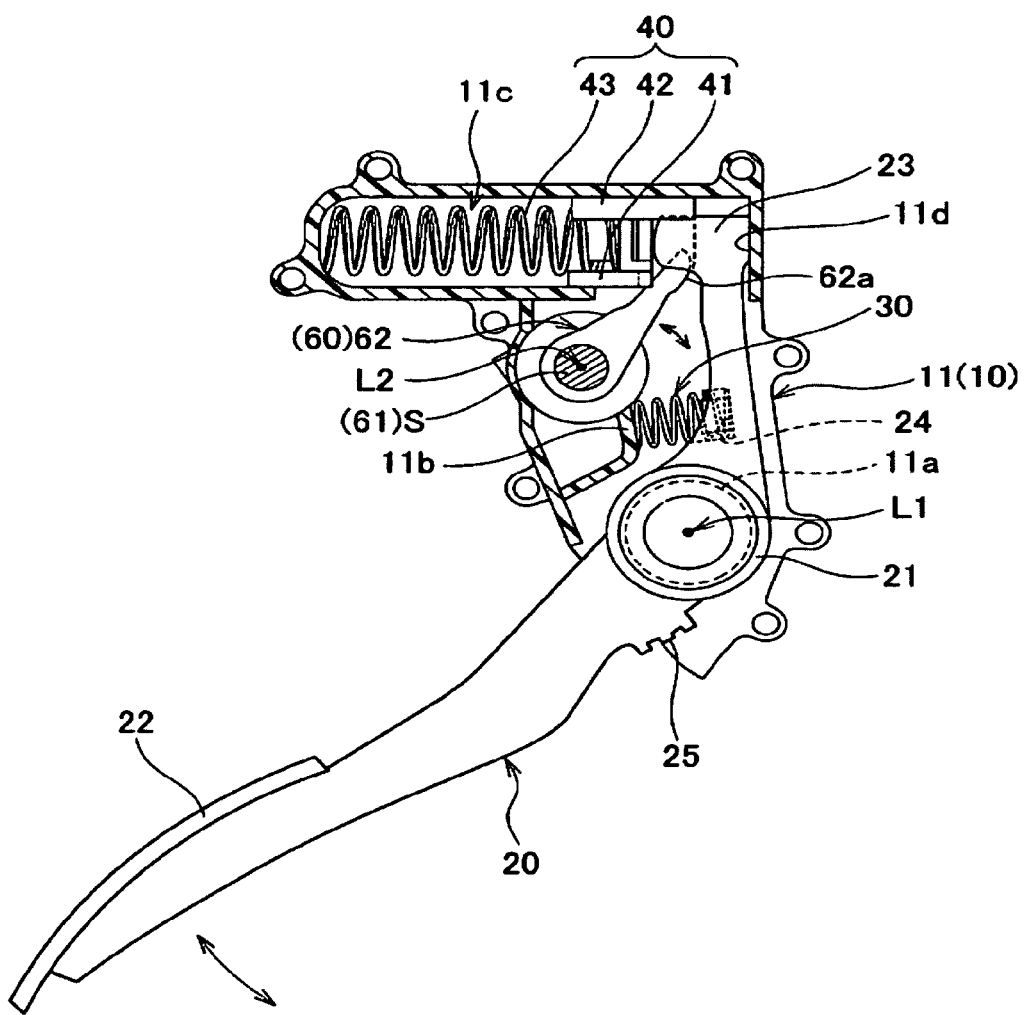
FIG. 4 is a side view showing the internal structure of the accelerator pedal device illustrated in FIG. 1.

The housing hemi 11 includes, as shown in FIG. 3 and FIG. 4, a spindle 11a to swingably support the pedal arm 20 around the pivot axis line L1, a reception part 11b to receive one end of the return spring 30, a concave portion 11c to house the hysteresis generation mechanism 40, a rest stopper 11d to stop the pedal arm 20 at the rest position, a notch part 11e to permit the rotation of the return lever 62, and a sensor housing unit 11f to house the position sensing device 63.

The housing hemi 12 includes, as shown in FIG. 1 and FIG. 2, a housing unit 12a to house the drive source 61, a full-bore stopper 12b to stop the pedal arm 20 at the full-bore position (maximum applied position), a sensor housing unit 12c to house the position sensing device 50, and a cover part 12d to cover the control unit 70.

Figure 5:
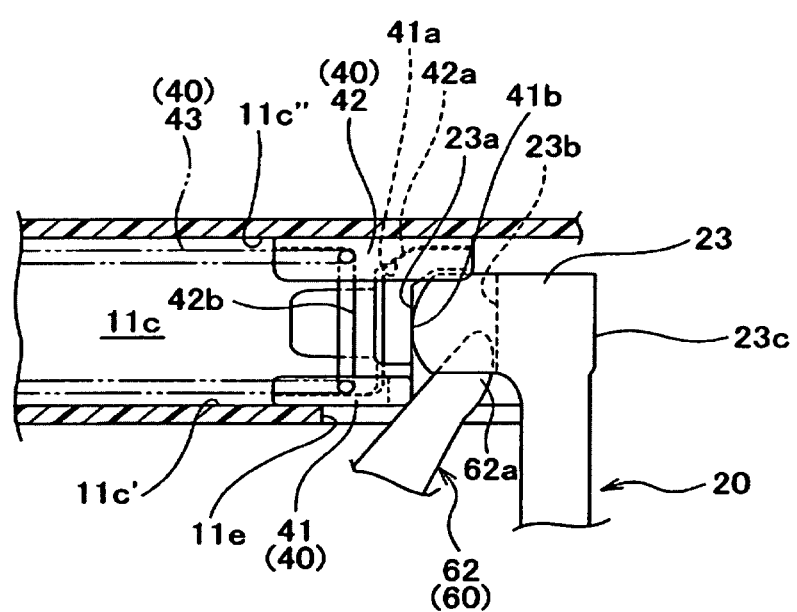
FIG. 5 is a partially expanded cross section showing an enlargement of an area of the hysteresis generation mechanism configuring a part of the accelerator pedal device illustrated in FIG. 1.

The overall pedal arm 20 is formed from a resin material and, as shown in FIG. 3 to FIG. 5, includes a cylindrical part 21 that is swingably supported by the spindle 11a of the housing 10, an accelerator pedal 22 that is formed integrally by extending downward from the cylindrical part 21, an upper end 23 that is formed integrally by extending upward from the cylindrical part 21, a reception part 24 that is formed in an area between the cylindrical part 21 and the upper end 23 and which receives the other end of the return spring 30, and a contact part 25 that is formed at the lower vicinity of the cylindrical part 21.

The cylindrical part 21, as shown in FIG. 4, is rotatable around the pivot axis line L1 as a result of being fitted with the spindle 11a of the housing 10.

The upper end 23 is formed, as shown in FIG. 5, so as to demarcate an engagement part 23a which is detachably engaged with the first slider 41 of the hysteresis generation mechanism 40, a receptive groove 23b to detachably receive the apical part 62a of the return lever 62, and a contact part 23c capable of coming in contact with the rest stopper 11d of the housing 10.

The return spring 30, as shown in FIG. 3 and FIG. 4, is a compression coil spring formed from spring steel or the like, where one end thereof is engaged with the reception part 11b of the housing 10 and the other end thereof is engaged with the reception part 24 of the pedal arm 20 and mounted in a state of being compressed to a prescribed compression allowance, and thereby applies biasing force to return the pedal arm 20 to the rest position.

The hysteresis generation mechanism 40, as shown in FIG. 3 to FIG. 5, is configured from a first slider 41, a second slider 42, and a return spring 43 housed in the concave portion 11c of the housing 10, and is formed to be detachably engaged with the upper end 23 of the pedal arm 20 so as to generate hysteresis in the pedal force (pedal load).

The first slider 41 is formed from resin material (for instance, highly slidable material such as oil-impregnated polyacetal) and includes, as shown in FIG. 5, an inclined surface 41a that slidably contacts a lower side inner wall surface 11c' of the housing hemi 11 (concave portion 11c) and which contacts an inclined surface 42a of the second slider 42, and an engagement surface 41b to which an engagement part 23a of the upper end 23 (of the pedal arm 20) is able to detachably engage.

The second slider 42 is formed from resin material (for instance, highly slidable material such as oil-impregnated polyacetal) and includes, as shown in FIG. 5, an inclined surface 42a that slidably contacts an upper side inner wall surface 11c" of the housing hemi 11 (concave portion 11c) and which contacts the inclined surface 41a of the first slider 41, and a reception surface 42b to receive one end of the return spring 43.

The return spring 43, as shown in FIG. 3 to FIG. 5, is a compression coil spring formed from spring steel or the like, where one end thereof is engaged with the reception surface 42b of the second slider 42 and the other end thereof is engaged with the side wall of (the concave portion 11c) of the housing 10 and mounted in a state of being compressed to a prescribed compression allowance. Consequently, the return spring 43 exerts a wedge action of pressing the inclined surface 42a of the second slider 42 against the inclined surface 41a of the first slider 41, and pressing the first slider 41 and the second slider 52 toward the lower side inner wall surface 11c' and the upper side inner wall surface 11c", as well as applies biasing force to return the pedal arm 30 to the rest position via the two sliders 42, 41.

Accordingly, if the pedal arm 20 is applied toward the maximum applied position (full-bore position) by counteracting the biasing force of the return spring 30 (and the return spring 43), the frictional force (slide resistance) generated from the wedge action of the inclined surfaces 41a, 42a will increase as a result of the upper end 23 pressing the first slider 41 toward the left side in FIG. 4 against the biasing force of the return spring 43, and the frictional force will increase linearly pursuant to the increase in the biasing force of the return spring 43.

Meanwhile, if the pedal arm 20 is returned toward the rest position according to the biasing force of the return spring 30 (and the return spring 43), the frictional force (slide resistance) generated from the wedge action of the inclined surfaces 41a, 42a will decrease, and the frictional force will linearly decrease as a result of the biasing force of the return spring 43 decreasing pursuant to the movement of the first slider 41 and the second slider 42 rightward in FIG. 4 toward the original position based on the biasing force of the return spring 43. Here, since the frictional force during the return movement will be smaller than the frictional force during the flooring operation, hysteresis can be generated in the overall pedal force (pedal load) from the flooring operation to the return movement.

Incidentally, if the first slider 41 gets stuck and stops during the return movement, the pedal arm 20 will return to its prescribed rest position as a result of the upper end 23 becoming detached from (the engagement surface 41b of) the first slider 41 due to the biasing force of the return spring 30.

The position sensing device 50 is arranged, as shown in FIG. 2, in the cylindrical part 21 of the pedal arm 20 and the sensor housing unit 12c of the housing hemi 12 in an area around the pivot axis line L1.

The position sensing device 50 is, for example, a non-contact or magnetic sensor, and is configured from a circular armature formed from a magnetic material and provided to an area of the cylindrical part 21 of the pedal arm 20, a pair of circular permanent magnets that are coupled in the inner peripheral face of the armature, two stators formed from a magnetic material that are embedded in the housing hemi 12, and two Hall elements arranged between the two stators, and, as other related components, is provided with a circuit board mounted with terminals and various electronic components.

The position sensing device 50 outputs voltage signals upon detecting changes in the magnetic flux density with the Hall elements based on the rotation of the pedal arm 20, and thereby detects the angular position of the pedal arm 20.

The active control mechanism 60 is configured, as shown in FIG. 1 to FIG. 4, from a drive source 61 housed in the housing unit 12a of the housing hemi 12, a return lever 62 that is directly connected to the drive source 61 and detachably engaged with the upper end 23 of the pedal arm 20 by protruding swingably from the housing unit 12a, and a position sensing device 63 that is housed in the sensor housing unit 11f of the housing hemi 11 and detects the rotation angle of the return lever 62.

The drive source 61 is a torque motor including a rotor that rotates around the rotating axis line L2 within a prescribed angle and which is directly connected to the return lever 62. Incidentally, without limitation to a torque motor, a drive source of other configurations may be applied so as long as it is able to rotate the return lever 62 by counteracting the pedal force of the pedal arm 20.

The return lever 62, as shown in FIG. 3 to FIG. 5, is directly connected to the axis S of the rotor that rotates around the rotating axis line L2, and the apical part 62a thereof is detachably engaged with the receptive groove 23b of the upper end 23 of the pedal arm 20 by being inserted therein.

If the drive source 61 is not applying the driving force (rotary torque), the return lever 62 rotates so as to follow the swing of the pedal arm 20; that is, freely rotates so as to following the movement of the upper end 23 without applying any resistance. Meanwhile, if the drive source 61 is applying the driving force (rotary torque), the return lever 62 applies push back force to the upper end 23 to push back the pedal arm 20 toward the rest position by resisting the pedal force.

Here, since the apical part 62a of the return lever 62 enters the receptive groove 23b of the upper end 23 upon engaging with the upper end 23 of the pedal arm 20 as shown in FIG. 4 and FIG. 5, it is possible to restrain the dispersion of the contact position and stably apply push back force to the pedal arm 20.

Moreover, with respect to the positional relationship of the return lever 62 and the pedal arm 20, as shown in FIG. 4, the return lever 62 is formed to engage with the upper end 23 of the pedal arm 20 by rotating in the same direction as the rotational direction (clockwise in FIG. 4) of the pedal arm 20 upon returning to the rest position.

Specifically, since the return lever 62 applies push back force by rotating in the same direction as the rotational direction of the pedal arm 20 to the rest position, it is possible to position the pivot axis line L1 of the pedal arm 20 and the rotating axis line L2 of the return lever 62 in close proximity, and this will contribute to the consolidation of the structure and the miniaturization of the device. Moreover, it is possible to cause the pedal arm 20 to smoothly follow the movement of the return lever 62 so as to smoothly transmit the push back force, and, consequently, stable push back force can be generated.

Here, since the active control mechanism 60 is configured from the drive source 61 (torque motor), and the return lever 62 that is rotatably driven with the drive source 61 and capable of detachably engaging with the upper end 23 of the pedal arm 20, the simplification of the active control mechanism 60 and the miniaturization of the device are achieved, and it is possible to improvement responsiveness when active control is required under prescribed conditions.

Moreover, since the return lever 62 rotates while describing an arc as with the upper end 23 of the pedal arm 20, the push back force that is applied from the return lever 62 to the pedal arm 20 becomes approximately constant regardless of the angle of the pedal arm 20, and it is thereby possible to obtain a preferred restraining force (push back force).

The position sensing device 63 is arranged, as shown in FIG. 1 and FIG. 3, in the sensor housing unit 11f of the housing hemi 11, and detects the rotation angle of the drive source 61; that is, the angular position of the return lever 62 in a state of being coupled with the housing hemi 12 housing the drive source 61 that directly connects the return lever 62. Incidentally, a contact or non-contact sensor may be used as the position sensing device 63.

The drive source 61 of the active control mechanism 60 configured as described above is arranged, as shown in FIG. 2 and FIG. 4, in an area that is sandwiched by the hysteresis generation mechanism 40 and the position sensing device 50.

According to this configuration, the components can be consolidated and arranged while maintaining the respective functions of the hysteresis generation mechanism 40, the position sensing device 50, and the active control mechanism 60, whereby the miniaturization of the device can be achieved.

The control unit 70 is used for controlling the drive of the drive source 61 of the active control mechanism 60 and, as shown in FIG. 1 and FIG. 2, is mounted inside the cover part 12d of the housing hemi 12.

As described above, the wiring and the like can be shortened and the reliability can be improved by integrally forming the control unit 70 and the housing 10. Moreover, it is possible to easily mount an accelerator pedal device including an active control mechanism 60 without requiring any significant change on the vehicle side.

In addition, a friction reduction member (for instance, a resin material or a metal material with high lubricating performance) to reduce the frictional force may be provided to either the upper end 23 (receptive groove 23b) of the pedal arm 20 or the return lever 62 in an engagement area of (the apical part 62a of) the return lever 62 and the upper end 23.

Consequently, if there is any slippage in the contact area between the return lever 62 and (the upper end 23 of) the pedal arm 20, the frictional resistance caused by the sliding can be reduced by interposing a friction reduction member between the two components, whereby the drive source 61 can be subject to power saving and miniaturization.

According to the accelerator pedal device configured as described above, with the hysteresis generation mechanism 40, the first slider 41 thereof is detachably engaged with (the upper end 23 of) the pedal arm 40 and, with the active control mechanism 60, the return lever 62 thereof is detachably engaged with (the upper end 23 of) the pedal arm 20. Thus, the respective mechanisms operate independently on the pedal arm 20, and it is possible to prevent one mechanism from affecting the other mechanism, and obtain the intended hysteresis characteristics in the pedal force.

In addition, even if the hysteresis generation mechanism 40 or the active control mechanism 60 malfunctions, since the first slider 41 and the return lever 62 are detachable from the pedal arm 20, it is possible to guarantee that the pedal arm 20 is reliably returned to the safe side (rest position).

Moreover, since the active control mechanism 60 is configured from a drive source 61 (for instance, a torque motor), and a return lever 62 that is rotatably driven by the drive source 61 and which is detachably engaged with the pedal arm 20, it is possible to improve the responsiveness in cases where active control is required under prescribed conditions while achieving the simplification of the active control mechanism 60 and the miniaturization of the device.

The operation of the accelerator pedal device is now explained.

Foremost, in a rest position where the operator (driver) is not flooring the accelerator pedal 22, the contact part 23c of the upper end 23 contacts the rest stopper 11d due to the biasing force of the return spring 30, and the pedal arm 20 is suspended at the rest position shown in FIG. 4. Here, the upper end 23 of the pedal arm 20 is in a state of being detachably engaged with the engagement surface 41b of the first slider 41. Moreover, the apical part 62a of the return lever 62 is in an engaged state that will not apply push back force to the upper end 23.

If the operator (driver) floors the accelerator pedal 22 from the foregoing state, the pedal arm 20 rotates counterclockwise in FIG. 4 by counteracting the biasing force of the return spring 30, rotates up to the maximum applied position (full-bore position) while increasing the resistance load (push back load) generated with the hysteresis generation mechanism 40, and the contact part 25 thereof contacts the full-bore stopper 12b of the housing 10 (housing hemi 12) and stops. In this flooring operation, the return lever 62 will follow the movement of the upper end 23 without applying any kind of load (push back force).

Meanwhile, if the operator (driver) loosens the pedal force, the pedal arm 20 will move toward the rest position based on the biasing force of the return spring 30 while applying a resistance load (pedal load) that is smaller than the resistance load (pedal load) during the flooring operation to the operator (driver), and the contact part 23c thereof contacts the rest stopper 11d of the housing 10 (housing hemi 11) and stops. During this return movement, the return lever 62 is pushed by the first slider 41 and follows the movement of the upper end 23 without applying any kind of load (push back force).

Meanwhile, if danger avoidance or danger warning is determined (under prescribed conditions) to be required (this is determined with a separate inter-vehicular distance detection system or the like) in a state where the operator (driver) is flooring the accelerator pedal 22, the drive source 61 of the active control mechanism 60 is started based on the control signal from the control unit 70 and the output signal from the position sensing device 63, the return lever 62 generates the clockwise rotary torque (push back force) in FIG. 4, and drive control is performed so that (the upper end 23 of) the pedal arm 20 is pushed back toward the rest position by counteracting the pedal force of the operator (driver).

Consequently, it is possible to improve the responsiveness when active control for danger avoidance or anger warning becomes required.

Moreover, as a result of directly working the push back force of the return lever 62 on (upper end 23 of) the pedal arm 20, it is possible to prevent any influence from being exerted on the hysteresis generation mechanism 40, and the intended hysteresis characteristics can be obtained in the pedal force.

Furthermore, even if the active control mechanism 60 were to malfunction, since the return lever 62 is detachable from the upper end 23 of the pedal arm 20, it is possible to guarantee that the pedal arm 20 is reliably returned to the safe side (rest position).

In addition, even if the hysteresis generation mechanism 40 and the active control mechanism 60 were to malfunction, since the return spring 30 is directly applying the biasing force, it is possible to guarantee that the pedal arm 20 is reliably returned to the safe side (rest position).

Although the foregoing embodiment explained a case where the active control mechanism 60 is arranged in an area that is sandwiched between the hysteresis generation mechanism 40 and the position sensing device 50, the present invention is not limited thereto, and other configurations may be adopted.

Although the foregoing embodiment explained a case where the rotational direction of the return lever 62 and the rotational direction of the pedal arm 20 are set to be the same direction, the present invention is not limited thereto, and the return lever may be configured to rotate in the opposite direction as the rotational direction of the pedal arm 20 and apply push back force to the upper end 23.

Although the foregoing embodiment explained a case where the first slider 41 of the hysteresis generation mechanism 40 and the return lever 62 of the active control mechanism 60 are detachably engaged with the upper end 23 of the pedal arm 20, this is not limited to the vicinity of the upper end 23 including the upper end 23, and it may be any other area so as long as it is possible to detachably engage with the pedal arm 20.

In the foregoing embodiment, although a case was shown where the accelerator pedal 22 is provided integrally with the pedal arm 20 as the pedal arm 20 that synchronizes with the accelerator pedal 22, the present invention is not limited thereto, and the accelerator pedal may also be configured such that it is swingably supported by the floor surface of a vehicle or the like, and the pedal arm is synchronized with the accelerator pedal via a link mechanism or the like.

Although the foregoing embodiment explained a case of mounting the control unit 70 integrally with the housing 10, the present invention is not limited thereto, and [the control unit 70] may be treated as a separate body by being separated from the housing 10.

As described above, since the accelerator pedal device of the present invention is capable of simplifying the structure, reducing the number of components, achieving cost reduction, and miniaturizing the overall device, successively combining the hysteresis generation mechanism for generating hysteresis in the pedal force and the active control mechanism for generating push back force that counteracts the pedal force of the accelerator pedal upon danger avoidance or danger warning, causing both mechanisms to function reliably in an independent manner, and performing active control superior in responsiveness, in addition to being applied to vehicles and the like, it is also useful in two-wheeled vehicles and other vehicles.

Although embodiments of the accelerator pedal device have been shown and described, it would be appreciated by those skilled in the art that changes may be made in these embodiments without departing from the principles and spirit of the invention, the scope of which is defined in the claims and their equivalents.

What is claimed is:

1. An accelerator pedal device, comprising:
a pedal arm working in conjunction with an accelerator pedal;
a housing to swingably support the pedal arm around a prescribed pivot axis line between a rest position and a maximum applied position;
a hysteresis generation mechanism that comes in contact with a vicinity of an upper end of the pedal arm to generate hysteresis in a pedal force of the accelerator pedal, the hysteresis generation mechanism being formed to be detachably engaged with the upper end of the pedal arm and formed in a concave portion of the housing; and
an active control mechanism to perform control to push back the pedal arm toward the rest position under prescribed conditions between the pivot axis line and the hysteresis generation mechanism, the active control mechanism being detachably engaged with an engagement part provided on an upper end of the pedal arm,
wherein the active control mechanism includes a drive source having a rotor that rotates around a rotating axis line within a prescribed angle provided in the housing, and a return lever that is directly connected to an axis of the rotor, the return lever including an apical part that is detachably engaged with a receptive groove that is formed within the engagement part, the return lever being rotatably driven with the drive source in a same rotational direction as a rotational direction of a swinging of the pedal arm toward the rest position,
wherein the return lever is detachably engaged in the receptive groove to apply the push back force to the pedal arm directly by rotating in the same rotational direction as the rotational direction of the swinging of the pedal arm toward the rest position, and
wherein the hysteresis generation mechanism includes a first slider having a first inclined surface and an engagement surface, a second slider having a second inclined surface and a reception surface, and a return spring to generate biasing force that returns the pedal arm to the rest position, the first inclined surface slidably contacting the second inclined surface, the engagement surface being detachably engaged with the engagement part of the upper end of the pedal arm, the reception surface receiving one end of the return spring, and wherein the engagement part of the upper end of the pedal arm is detachably engaged with the first slider of the hysteresis generation mechanism and the receptive groove to detachably receive the return lever of the active control mechanism.

2. The accelerator pedal device according to claim 1, wherein at least one of the receptive groove and the return lever includes a friction reduction member.

3. The accelerator pedal device according to claim 1, wherein the housing includes a control unit to control the drive source.

4. The accelerator pedal device according to claim 2, wherein the housing includes a control unit to control the drive source.

* * * * *

UNITED STATES PATENT AND TRADEMARK OFFICE
CERTIFICATE OF CORRECTION

| | | |
|---|---|---|
| PATENT NO. | : 9,079,492 B2 | Page 1 of 1 |
| APPLICATION NO. | : 12/588119 | |
| DATED | : July 14, 2015 | |
| INVENTOR(S) | : Tsuyoshi Osawa et al. | |

It is certified that error appears in the above-identified patent and that said Letters Patent is hereby corrected as shown below:

In the Claims

Claim 1, Column 10, Line 64

After "position," delete "and".

Signed and Sealed this
Thirteenth Day of October, 2015

Michelle K. Lee
*Director of the United States Patent and Trademark Office*